United States Patent
Tione (10) Patent No.: US 12,454,254 B2
(45) Date of Patent: Oct. 28, 2025

(54) ACOUSTIC CONTROL SYSTEM FOR A VEHICLE

(71) Applicant: FAIVELEY TRANSPORT ITALIA S.P.A., Piossasco (IT)

(72) Inventor: Roberto Tione, Lauriano (IT)

(73) Assignee: Faiveley Transport Italia S.P.A., Piossasco (IT)

( * ) Notice: Subject to any disclaimer, the term of this patent is extended or adjusted under 35 U.S.C. 154(b) by 724 days.

(21) Appl. No.: 17/879,689

(22) Filed: Aug. 2, 2022

(65) Prior Publication Data
US 2022/0371559 A1    Nov. 24, 2022

Related U.S. Application Data

(63) Continuation-in-part of application No. 16/618,436, filed as application No. PCT/IB2018/053774 on May 28, 2018, now abandoned.

(30) Foreign Application Priority Data

May 30, 2017    (IT) .......................... 102017000058879

(51) Int. Cl.
B60T 8/17        (2006.01)
B60T 13/74       (2006.01)
H04R 3/04        (2006.01)

(52) U.S. Cl.
CPC ............ B60T 8/1705 (2013.01); B60T 13/74 (2013.01); H04R 3/04 (2013.01); *H04R 2499/13* (2013.01)

(58) Field of Classification Search
CPC .......... B60T 8/1705; B60T 13/74; H04R 3/04; H04R 2499/13
USPC ........................... 303/3, 7, 20, 127, 128, 133
See application file for complete search history.

(56) References Cited

U.S. PATENT DOCUMENTS

| | | | | |
|---|---|---|---|---|
| 4,819,994 A | * | 4/1989 | Holroyd | B60T 8/17616 303/191 |
| 5,905,433 A | * | 5/1999 | Wortham | G07C 5/008 340/3.4 |
| 6,222,443 B1 | * | 4/2001 | Beeson | B60D 1/62 340/539.1 |
| 2002/0153765 A1 | | 10/2002 | Levy et al. | |

FOREIGN PATENT DOCUMENTS

WO    2017025895 A    2/2017

* cited by examiner

*Primary Examiner* — Christopher P Schwartz
(74) *Attorney, Agent, or Firm* — K&L Gates LLP (57) ABSTRACT

A control system may include a modulator device that may receive a control signal for changing a traction operation or a braking operation of a vehicle system formed from one or more vehicles. The modulator device may generate an electric modulator signal based on the control signal and may control an actuator using the modulator signal to create an acoustic signal for propagation within a conduit extending along the vehicle system. The system also may include a transducer device that may detect the acoustic signal propagated in the conduit and generate an electric transducer signal based on the acoustic signal. The system may include a demodulator device that may control one or more of a traction device or a braking device to implement the control signal based on the transducer signal that is received.

20 Claims, 5 Drawing Sheets

ACOUSTIC CONTROL SYSTEM FOR A VEHICLE

CROSS-REFERENCE TO RELATED APPLICATIONS

This application is a continuation-in-part of U.S. patent application Ser. No. 16/618,436 (filed 2 Dec. 2019), which is a National Phase entry of International Patent Application No. PCT/IB2018/053774 (filed 28 May 2018), which claims priority to Italian Patent Application No. 102017000058879 (filed 30 May 2017). The entire contents of each of these applications is hereby incorporated by reference in their entirety.

BACKGROUND

Technical Field

The described subject matter relates to control systems of vehicles, such as acoustic control systems that control traction and braking of vehicles.

Discussion of Art

Figure 1:
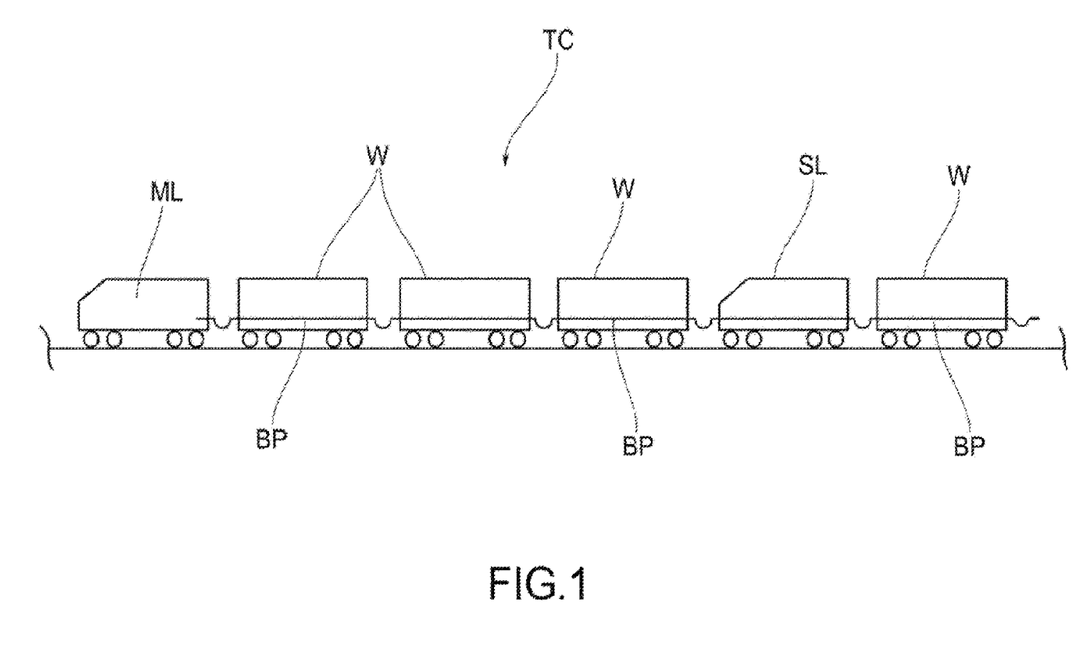
FIG. 1 schematically illustrates a multi-vehicle system.

The "distributed power" technique may distribute several propulsion-generating vehicles (e.g., locomotives) along a multi-vehicle system (e.g., a train), which may be of exceptional length and weight (as shown in FIG. 1). The propulsion-generating vehicles distributed along the multi-vehicle system may be synchronized with each other by a radio control system. A first propulsion-generating vehicle may be referred to as the master, lead, or controlling vehicle and may replicate traction and/or braking commands to other propulsion-generating vehicles, called slave, remote, or controlled propulsion-generating vehicles by means of the radio control system.

The distributed power system may better distribute traction and braking forces along the multi-vehicle system, which can significantly reduce longitudinal forces that could trigger processes of vehicle system failure or accident (e.g., derailment, collisions, etc.)

An accurate description of the distributed power system and its benefits is contained in WO2017025895, where the drawbacks of possible faults in the radio control system are also fully described and corrective solutions are claimed for operating the train in degraded conditions.

Figure 2:
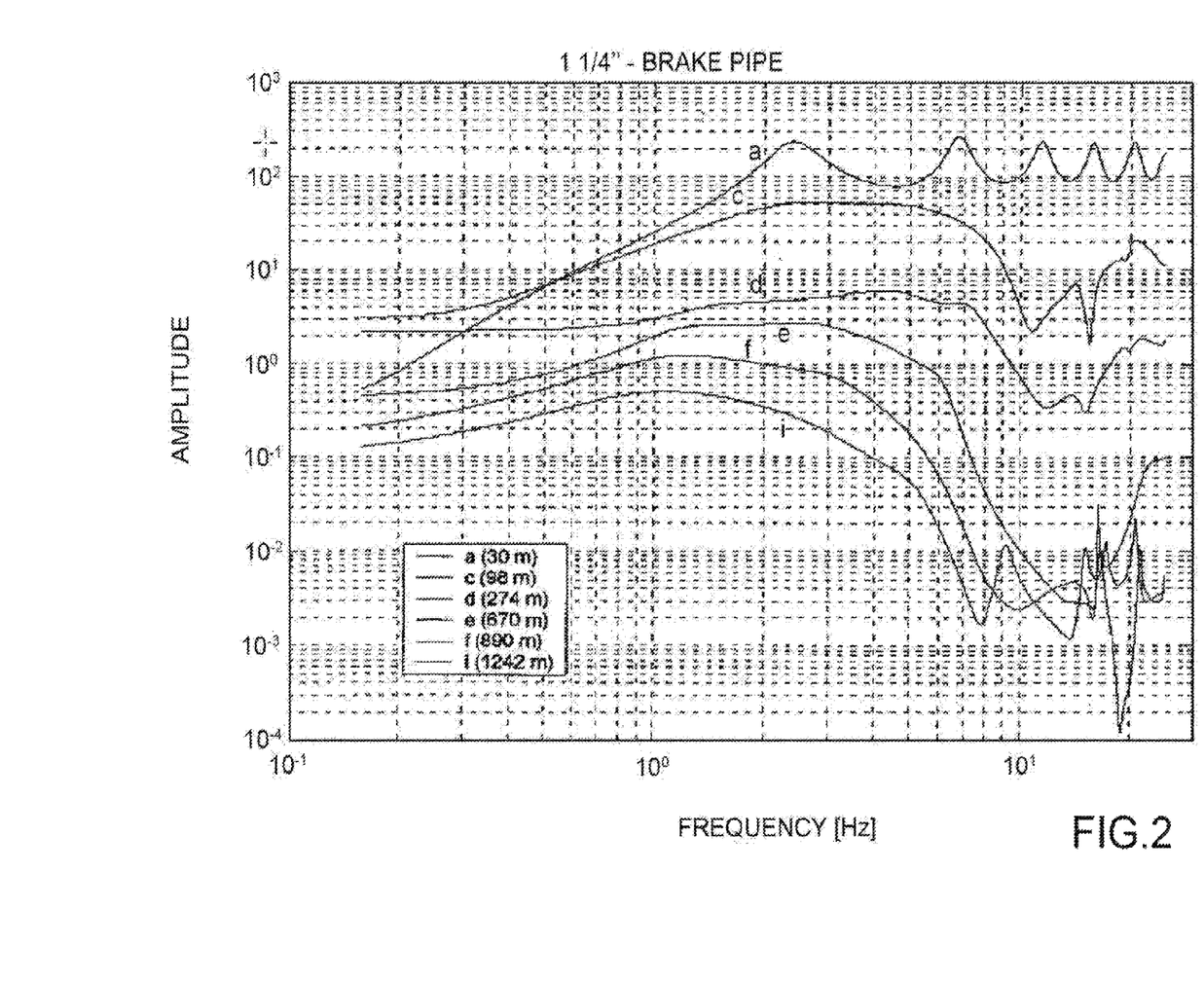
FIG. 2 illustrates a Bode diagram of amplitudes as frequency changes, as a function of various vehicle system lengths, measured on a real system.

According to the report 100-002 "Sonar Transmission through the Train Brake System", Hans Sandholt, Bengt Schmidtbauer, reporting the results of tests carried out in collaboration between the Swedish institute CHARMEC and the company SAB-WABCO Italia, today Faiveley Transport Italia, it may be possible to transmit waves at subsonic frequencies along the brake line of a train up to 1.5 km long, at a maximum frequency between 5 Hz and 10 Hz. FIG. 2 shows the Bode diagram of the amplitudes as the frequency varies for various lengths of vehicle systems, measured on a real system: for lengths less than 30 m (curve "a" in FIG. 2), the usable band extends to frequencies on the order of tens of Hz, while for lengths greater than 1000 m, the attenuation knee occurs already at 5 Hz.

US2002153765 claims propagation of negative and positive pressure pulses along the brake line of a railway train to transmit traction or braking commands. According to such method, it may not be possible to continuously modulate traction or braking commands.

It may be desirable to have a system and method that differ from those that are currently available.

BRIEF DESCRIPTION

In one example, a control system is provided that may include a modulator device that may receive a control signal for changing a traction operation or a braking operation of a vehicle system formed from one or more vehicles. The modulator device may generate an electric modulator signal based on the control signal and may control an actuator using the modulator signal to create an acoustic signal for propagation within a conduit extending along the vehicle system. The system also may include a transducer device that may detect the acoustic signal propagated in the conduit and generate an electric transducer signal based on the acoustic signal. The system may include a demodulator device that may control one or more of a traction device or a braking device to implement the control signal based on the transducer signal that is received.

In another example, a method is provided that may include receiving a control signal for changing a traction operation or a braking operation of a vehicle system formed from one or more vehicles, generating an electric modulator signal based on the control signal, controlling an actuator using the modulator signal to create an acoustic signal for propagation within a conduit extending along the vehicle system, detecting the acoustic signal propagated in the conduit, generating an electric transducer signal based on the acoustic signal, and controlling one or more of a traction device or a braking device to implement the control signal based on the transducer signal that is received.

In another example, a control system may include a modulator device that may receive a control signal for changing a traction operation or a braking operation of a vehicle system. The modulator device may control an actuator to create an acoustic signal based on the control signal. The system may include a demodulator device that may control one or more of a traction device or a braking device to implement the control signal based on the acoustic signal that is received.

BRIEF DESCRIPTION OF THE DRAWINGS

The subject matter may be understood from reading the following description of non-limiting embodiments, with reference to the attached drawings, wherein below.

DETAILED DESCRIPTION

One or more embodiments described here include an acoustic control system that can repeatedly or continuously control traction and braking control of a vehicle system. The control system may control the vehicle system as a multi-vehicle system using distributed power technology, such as in the event of a fault in the radio control system. The control system may use propagation of acoustic waves inside a conduit (e.g., a brake pipe or other conduit). For example, the control system may include or utilize a brake pipe, a controlling vehicle comprising traction and braking devices, and at least one controlled vehicle comprising traction and braking devices.

The acoustic control system may include a modulator device associated with the controlling vehicle. The modulator device can represent or be embodied in hardware circuitry that includes and/or is coupled with one or more processors (e.g., one or more microcontrollers, field programmable gate arrays, integrated circuits, microprocessors, etc.) that perform the operations described herein in connection with the modulator device. The modulator device may receive traction and/or braking request signals. The modulator device can generate an electrical signal able to excite an actuator which transforms the electrical signal into a respective acoustic signal to be sent inside a conduit (e.g., a brake pipe). This electrical signal may be referred to as a modulator signal. The frequency value of the acoustic signal may be adjusted as a function of an amplitude value of the traction and/or braking request signal according to a predetermined trans-characteristic function. For example, the frequency of the acoustic signal may increase or decrease responsive to the magnitude of the change or commanded traction setting and/or brake setting. For high throttle commands (e.g., to greatly increase the tractive power generated by the vehicles), the frequency value may be larger (or smaller), while for lower throttle commands (e.g., to decrease or increase the tractive power by a lesser amount), the frequency value may be smaller (or larger). For high brake commands (e.g., to greatly increase the braking effort generated by the vehicles), the frequency value may be larger (or smaller), while for lower brake commands (e.g., to decrease or increase the braking effort by a lesser amount), the frequency value may be smaller (or larger). The function may be a linear function, a non-linear function, or a function comprising both linear and non-linear relationships between the amplitude (e.g., the input to the function) and frequency (e.g., the output of the function).

The control system may include at least one transducer device associated with at least one of the controlled vehicle(s). The transducer device may include one or more transducers, and optionally one or more processors that perform the operations described herein in connection with the transducer device. The transducer device may detect the acoustic signal generated by the modulator device and convert the amplitude value of the acoustic signal into another electrical signal. The amplitude value may be an instantaneous value of the amplitude of the acoustic signals, such as the value of amplitude that is measured or sensed by the transducer device. The frequency value of this other electrical signal may be adjusted according to the frequency of the acoustic signal. For example, the frequency value of the electric signal may larger (or smaller) for increased frequencies of the acoustic signal and may be smaller (or larger) for decreased frequencies of the acoustic signal. This electric signal may be referred to as the transducer electric signal.

The control system may include at least one frequency demodulator associated with at least one of the controlled vehicle(s). The demodulator may include one or more demodulators, and optionally one or more processors that perform the operations described herein in connection with the demodulator. The demodulator may generate a traction or braking management signal having an amplitude value that is adjusted according to the frequency of the transducer electrical signal. The traction or braking management signal may be transmitted by the frequency demodulator to a traction and braking management system associated with the controlled vehicle. This management signal may control traction and/or braking of the controlled vehicle.

While one or more embodiments are described in connection with rail vehicles and a rail vehicle system, not all embodiments are limited to rail vehicle systems. Unless expressly disclaimed or stated otherwise, the subject matter described herein extends to other types of vehicle systems, such as automobiles, trucks (with or without trailers), buses, marine vessels, aircraft, mining vehicles, agricultural vehicles, or other off-highway vehicles, that can acoustically communicate with each other (e.g., via a medium in a conduit or other pipe, such as air, liquid, etc., in a pipe). The vehicle systems described herein (rail vehicle systems or other vehicle systems that do not travel on rails or tracks) may be formed from a single vehicle or multiple vehicles. With respect to multi-vehicle systems, the vehicles may be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy).

The control systems and methods described herein may modulate subsonic waves superposed at pressure for transmitting information related to traction and braking commands along a conduit extending along all or at least part of a single vehicle system or multi-vehicle system (e.g., a brake line). In one aspect, for example, the pressure of pressurized fluid (e.g., compressed air) in a brake line or brake pipe of a train or other multi-vehicle system is controlled (using valves) for service and/or emergency braking, e.g., when the pressure of the fluid is high, brakes of the vehicle system are off (deactivated) and when the pressure of the fluid is low (relatively), the brakes are on (activated). Using the pressurized fluid as a communication medium, the control system modulates acoustic waves onto the pressurized fluid. Thus, the control system in effect superposes a 'second' control signal, at a different frequency, onto a baseline (and typically lower frequency) brake pipe signal that is used for controlling the brakes generally. (It may take several seconds for brake pipe pressure to transition from low to high or vice versa in the train brake pipe for service braking; thus, the baseline signal may be on the order of 0.3 Hz to 1 Hz, for example.) In other embodiments, the control system may be configured to modulate the acoustic signals onto the pressurized fluid in the brake pipe or other conduit only when the pressure of the pressurized fluid is in a designated state or condition, e.g., at high pressure and not currently changing.

Figure 3:
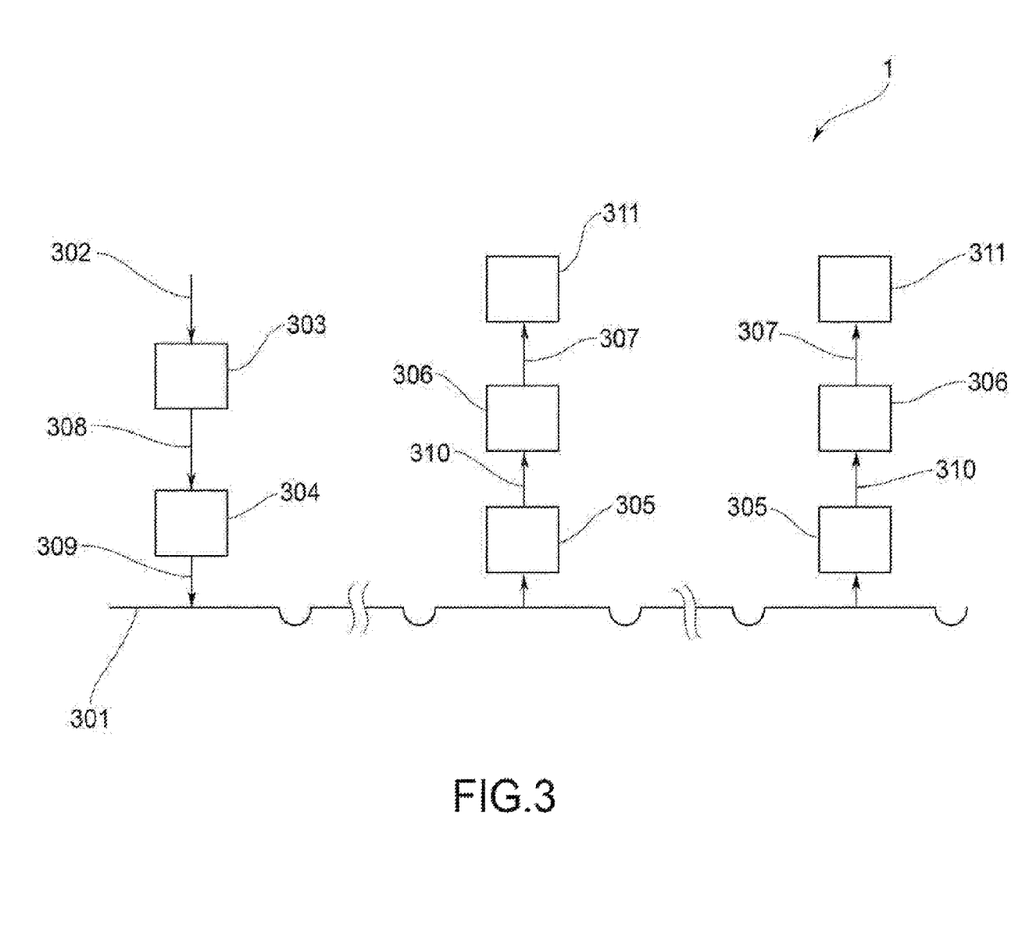
FIG. 3 schematically illustrates one example of an acoustic vehicle control system.

FIG. 3 illustrates one example of an acoustic control system 1 for a vehicle system TC. The control system may include or use (without including) a conduit 301, such as a brake pipe or other pipe extending along all or part of the length of the vehicle system. The vehicle system may include a master or controlling vehicle ML. The controlling vehicle can include traction and braking devices, such as one or more motors, engines, air brakes, friction brakes, or the like. The vehicle system may include at least one slave or controlled vehicle SL, which also can include traction and braking devices. Optionally, the vehicle system may include or be formed from only a single propulsion-generating vehicle (e.g., a single controlling vehicle).

The control system may include a modulator device 303 associated with (e.g., disposed on) the controlling vehicle. Alternatively, the modulator device may be in another location of the vehicle system. The modulator device may receive a traction or braking request signal 302. This request signal may be received from an operator, from an input device (e.g., a pedal, button, switch, lever, touchscreen, etc.), from another system (e.g., an energy management system, a navigation system, etc.). The modulator device can generate an electrical modulator signal 308 adapted to energize an actuator 304. The actuator can include a body, diaphragm, paddle, or the like, which vibrates or otherwise moves to transform the modulator signal into a respective acoustic signal 309 transmitted inside the conduit.

The modulator device may receive information to be transmitted and perform a suitable modulation thereof, subsequently driving the actuator to transform the electrical modulator signal into the acoustic signal. The acoustic signal is then propagated along the conduit.

For example, the traction or braking request signals may be generated by traction and braking commands given by an engine driver by a special command lever, by automatic traction or braking systems, or the like.

The frequency value of the acoustic signal can be adjusted according to the amplitude value of the traction or braking request signal. For example, modulator can determine a frequency at which the actuator is to be excited and/or produce the acoustic signal, where this frequency is determined according to or using a predetermined trans-characteristic function. For example, a curve of the trans-characteristic function may represent a non-linear relationship between an input (e.g., the amplitude or magnitude of the request signal) and an output (e.g., the frequency value of the acoustic signal), potentially within an existence range thereof.

The control system also may include at least one transducer device 305. The transducer device can represent hardware circuitry that includes and/or is connected with one or more processors that perform the operations described in connection with the transducer or transducer device. The transducer device may be associated with the controlled vehicle. For example, each or at least one of the controlled vehicles in the vehicle system may include a transducer device.

The transducer device may detect the acoustic signal propagated via vibrations of the conduit (e.g., brake pipe), the gas (e.g., air), the liquid, or the like, within the conduit. The transducer device detects and converts the amplitude of the acoustic signal into an electrical signal 310 (e.g., the transducer signal). The value of the frequency of the transducer signal may be adjusted according to the frequency of the acoustic signal. For example, the frequency of the transducer signal may be based on the frequency of the acoustic signal. The frequency of the transducer signal may coincide (e.g., be the same as) the frequency of the acoustic signal. Alternatively, the frequency of the transducer signal may differ, but change according to, the frequency of the acoustic signal. For example, the frequency of the transducer signal may increase as the acoustic signal frequency increases, and the frequency of the transducer signal may decrease as the acoustic signal frequency decreases. Conversely, the frequency of the transducer signal may decrease as the acoustic signal frequency increases, and the frequency of the transducer signal may increase as the acoustic signal frequency decreases.

The control system may include at least one frequency demodulator 306 associated with the controlled vehicle. The frequency demodulator, demodulator, or demodulator device can represent hardware circuitry that includes and/or is connected with one or more processors that perform the operations described in connection with the demodulator. The demodulator may generate a traction or braking management signal 307. The management signal may be generated to have an amplitude value that is adjusted or based on the frequency of the electrical transducer signal, similar to as described above. The management signal may be transmitted by the demodulator to a traction and braking management system 311. The management system can represent a vehicle controller, such as hardware circuitry that includes and/or is connected with one or more processors that control operation of the traction devices (e.g., engines, motors, etc.) and/or braking devices (e.g., air brakes, friction brakes, motors used in dynamic braking, etc.). The management system (or vehicle controller) may be associated with (e.g., disposed on) each or at least one of the controlled vehicles for the management of traction and braking. For example, the transducer device may be installed on one or more controlled vehicles along the conduit of the vehicle system. The transducer device can transform the acoustic signal that is received by the transducer device into the transducer signal for demodulators charged with reconstructing the initial information (represented by the acoustic signal) and providing the information to the management system.

Figure 4A:
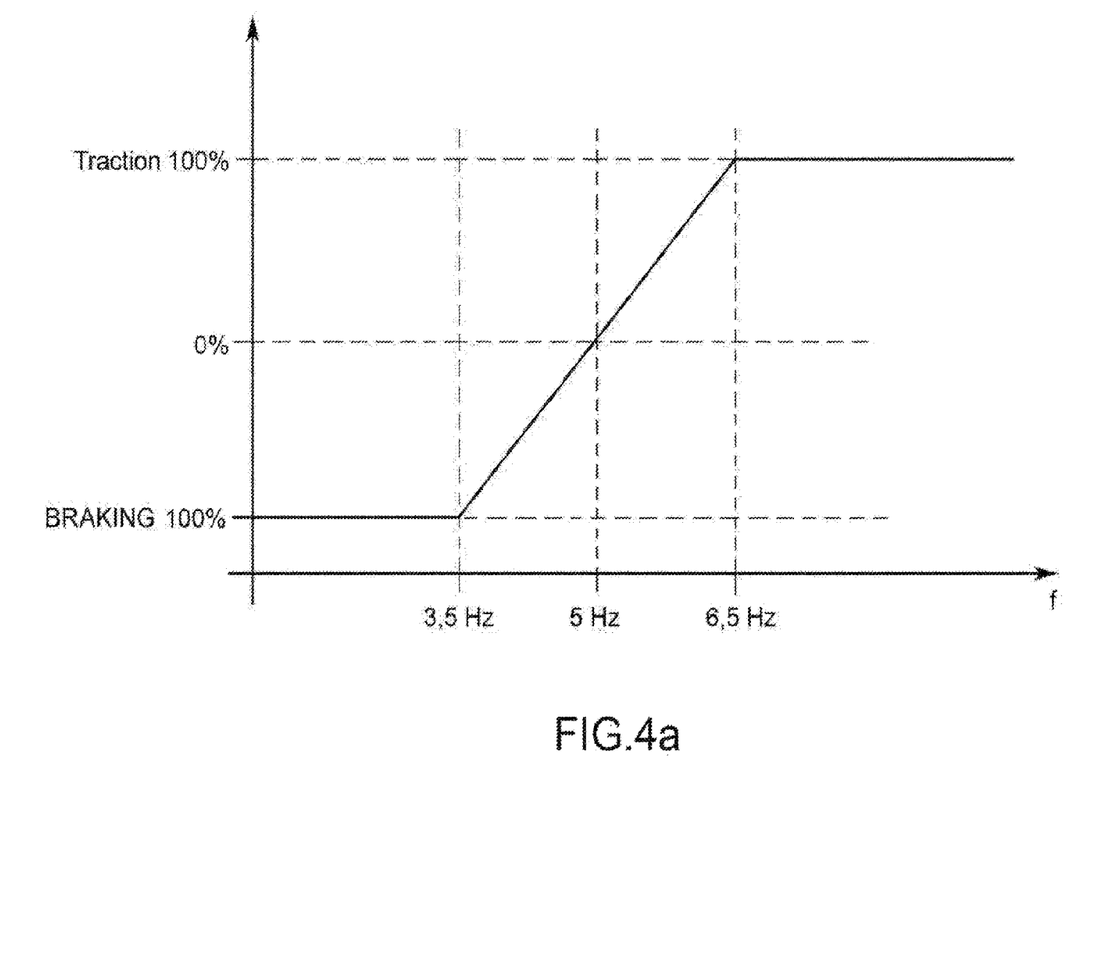
FIG. 4a illustrates a first example of modulation.

The acoustic signal can be created to transmit information through the conduit to several controlled vehicles (e.g., throughout the length of the entire vehicle system). For example, the acoustic signal can be created using subsonic frequencies, as indicated in the cases "e", "f", "i" shown in FIG. 2. The most appropriate type of modulation may be a modulation of a sinusoidal frequency, for example 5 Hz (or another frequency), in a limited range of modulation, for example +/−1.5 Hz (or another range). Such a limited range of modulation may allow transmission of only traction and braking commands, for example but not exclusively as shown in FIG. 4a. Alternatively, other or additional commands or information may be communicated.

Figure 4B:
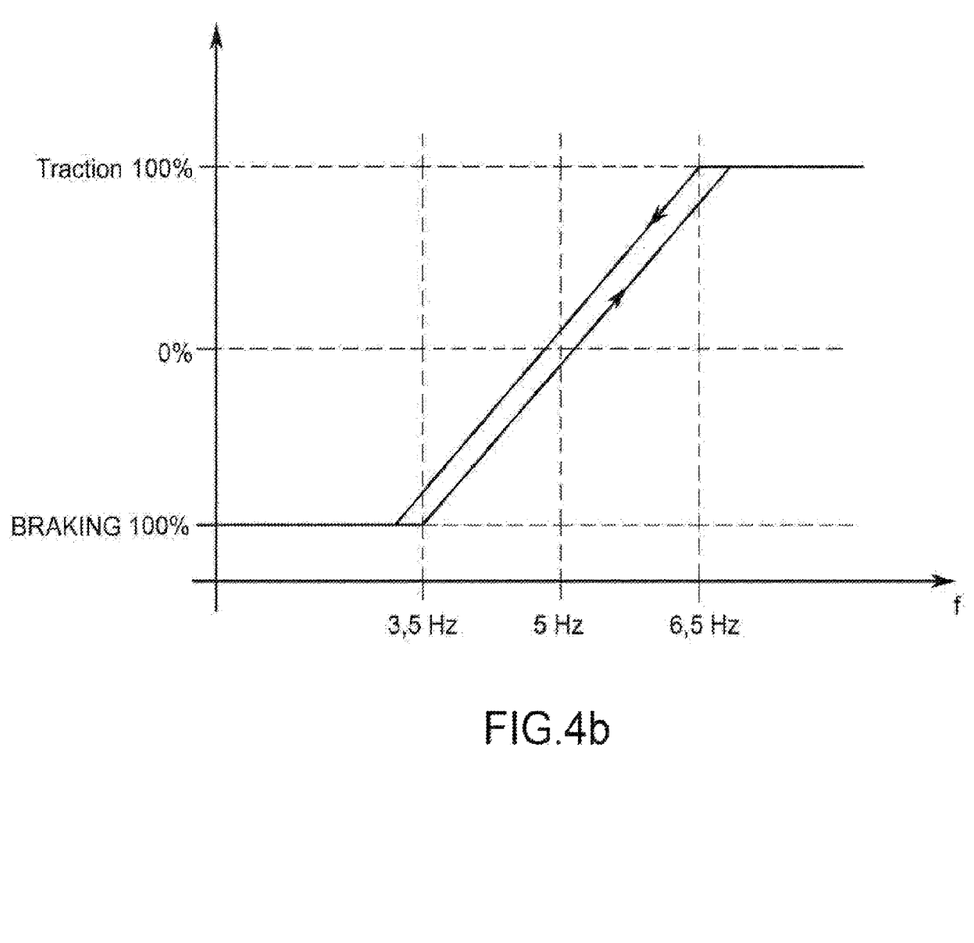
FIG. 4b illustrates a second example of modulation.

A frequency value equal to or less than 3.5 Hz may represent a maximum or other upper limit braking request value, including emergency braking. A frequency value equal to or greater than 6.5 Hz may represent a maximum or other upper limit traction request value. A variant is shown in FIG. 4b.

To make the control system more insensitive to noise, a hysteresis value may be inserted into the acoustic signal. This value may be fixed or may dynamically change by the control system according to the noise measured during operation. For example, the modulator device may control the actuator to insert the hysteresis value into the acoustic signal. The curves of FIGS. 4a and 4b have the advantage of guaranteeing the braking request in the case of a no-signal condition, that is, for example, in the case of cutting the pipe or another leak in the conduit. Other transfer functions may be realized according to the same principle, favoring a precise action in case of loss of the acoustic signal.

In the same way, discontinuous and/or non-linear functions may be used to determine the hysteresis value, thereby creating areas with lower gain (higher resolution) and areas with greater gain (lower resolution). For example, the hysteresis value may be obtained from one or more functions with a measured or default amount of noise as an input to the function(s) and the output of the function(s) being the hysteresis value that is added or inserted into the acoustic signal.

As shown in FIG. 2, in the case "a," it is possible to see how periodic amplitude peaks may occur when the frequency changes. This phenomenon may be caused by reflections along the transmission line (e.g., the conduit) if the line is properly balanced with the frequencies or not. To optimize or otherwise improve the transmission frequency, the system may perform a calibration procedure of the central transmission frequency, with the help of the radio system of the distributed power system when such system is available. For example, during the initialization phase of the system, the modulator device may perform a slow frequency variation within a predefined range generating respective calibration signals of predetermined amplitude. The frequency demodulators may measure the amplitude trend of the signal received upon variation of the frequency generated by the modulator device and may identify the upper peaks. At the end of the procedure, the controlled vehicles or vehicle units may transmit each of the frequencies and amplitudes of the peaks detected to the controlling vehicle or vehicle unit. Subsequently, the modulator device may determine a value or a most appropriate value at which to fix the central modulation frequency, for example, but not exclusively, by choosing the value corresponding to the maximum or other peak detected by the farthest frequency demodulator or another demodulator. At this point, the modulator device may communicate to the various frequency demodulators by the radio system or in another manner, the central frequency value at which the modulator device will perform the frequency modulation actions.

The control system for acoustic traction-braking transmission may be used as a backup system to a radio traction-braking transmission system, in case of damage or malfunction of the radio traction-braking transmission system.

An acoustic traction and braking control method also is described, which includes the steps of:

receiving at least one traction or braking request signal 302 and generating, using a modulator device 303 associated with a controlling vehicle ML, an electrical signal 308 adapted to energize an actuator 304 provided to transform the electrical signal 308 into a respective acoustic signal 309;

transmitting the acoustic signal 309 in a conduit (e.g., the brake pipe 301);

adjusting the frequency value of the acoustic signal 309 according to the amplitude value of at least one traction or braking request signal 302, in accordance with a predetermined trans-characteristic function;

detecting, using at least one transducer device 305 associated with at least one controlled vehicle SL, the acoustic signal 309;

converting, using the transducer device 305, the instantaneous or other amplitude value of the acoustic signal 309 into an electrical signal 310, of which the frequency value is adjusted according to the frequency of the acoustic signal 309;

generating, using a frequency demodulator 306 associated with said at least one controlled vehicle SL, a traction or braking management signal 307, the amplitude value of which being adjusted according to the frequency of the electrical signal 310; and transmitting, using the frequency demodulator 306, the traction or braking management signal 307 to a traction and braking management system 311 associated with the at least one controlled vehicle SL.

Several aspects and embodiments of an acoustic traction and braking control system of a train according to the present invention have been described. It is understood that each embodiment may be combined with any other embodiment. The invention, moreover, is not limited to the described embodiments, but may vary within the scope of protection as described and claimed herein.

In one example, a control system is provided that may include a modulator device that may receive a control signal for changing a traction operation or a braking operation of a vehicle system formed from one or more vehicles. The modulator device may generate an electric modulator signal based on the control signal and may control an actuator using the modulator signal to create an acoustic signal for propagation within a conduit extending along the vehicle system. The system also may include a transducer device that may detect the acoustic signal propagated in the conduit and generate an electric transducer signal based on the acoustic signal. The system may include a demodulator device that may control one or more of a traction device or a braking device to implement the control signal based on the transducer signal that is received.

The one or more vehicles of the vehicle system may include at least two vehicles, and the modulator device may be located onboard a first vehicle of the at least two vehicles. The transducer device and the demodulator device may be located onboard a second vehicle of the at least two vehicles. The modulator device may control the actuator to create the acoustic signal for propagation within a brake pipe of the vehicle system as the conduit. The transducer device may determine an amplitude of the acoustic signal and to create the transducer signal based on the amplitude that is determined.

The transducer device may create the transducer signal with a frequency that is based on the amplitude that is determined. The demodulator device may control the one or more of the traction device or the braking device based on the frequency of the transducer signal. The transducer device may determine the frequency of the transducer signal based on a predetermined function between the frequency and the amplitude that is determined.

In another example, a method is provided that may include receiving a control signal for changing a traction operation or a braking operation of a vehicle system formed from one or more vehicles, generating an electric modulator signal based on the control signal, controlling an actuator using the modulator signal to create an acoustic signal for propagation within a conduit extending along the vehicle system, detecting the acoustic signal propagated in the conduit, generating an electric transducer signal based on the acoustic signal, and controlling one or more of a traction device or a braking device to implement the control signal based on the transducer signal that is received.

The acoustic signal may be created for propagation within a brake pipe of the vehicle system as the conduit. The method also may include determining an amplitude of the acoustic signal, where the transducer signal is created based on the amplitude that is determined. The transducer signal may be created with a frequency that is based on the amplitude that is determined. The one or more of the traction device or the braking device may be controlled based on the frequency of the transducer signal. The method also may include determining the frequency of the transducer signal based on a predetermined function between the frequency and the amplitude that is determined.

In another example, a control system may include a modulator device that may receive a control signal for changing a traction operation or a braking operation of a vehicle system. The modulator device may control an actuator to create an acoustic signal based on the control signal. The system may include a demodulator device that may control one or more of a traction device or a braking device to implement the control signal based on the acoustic signal that is received.

The system may include a transducer device that can detect the acoustic signal that propagates along a conduit of the vehicle system from the actuator to the transducer device. The modulator device may be located onboard a first vehicle of the vehicle system, and the transducer device and the demodulator device are configured to be located onboard a second vehicle of the vehicle system. The conduit may include a brake pipe of the vehicle system. The modulator device may control the actuator to create the acoustic signal for propagation within the brake pipe.

The transducer device may determine an amplitude of the acoustic signal and to create the transducer signal based on the amplitude that is determined. The transducer device may create the transducer signal with a frequency that is based on the amplitude that is determined. The demodulator device may control the one or more of the traction device or the braking device based on the frequency of the transducer signal.

In one embodiment, the control system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the control system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via backpropagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models is obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The control system can use this artificial intelligence or machine learning to receive input, use a model that associates different inputs with different transmission frequencies to select a transmission frequency, and then provide an output (e.g., the frequency selected using the model). The controller may receive additional input, such as analysis of noise or interference in the acoustic signal that is sent using that frequency, operator input, or the like, which indicates whether the machine-selected frequency provided a desirable outcome or not. Based on this additional input, the controller can change the model, such as by changing which frequency would be selected when a similar or identical input is received the next time or iteration. The control system can then use the changed or updated model again to select a transmission frequency, receive feedback on the selected frequency, change or update the model again, etc., in additional iterations to repeatedly improve or change the model using artificial intelligence or machine learning.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following clauses, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the subject matter without departing from its scope. While the dimensions and types of materials described herein define the parameters of the subject matter, they are exemplary embodiments. Other embodiments will be apparent to one of ordinary skill in the art upon reviewing the above description. The scope of the subject matter should, therefore, be determined with reference to the appended claims, along with the full scope of equivalents to which such clauses are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A control system comprising:
a modulator device configured to receive a control signal for changing a traction operation or a braking operation of a vehicle system formed from one or more vehicles, the modulator device configured to generate an electric modulator signal based on the control signal, the modulator device configured to control an actuator using the modulator signal to create an acoustic signal for propagation within a conduit extending along the vehicle system;
a transducer device configured to detect the acoustic signal propagated in the conduit and generate an electric transducer signal based on the acoustic signal; and
a demodulator device configured to control one or more of a traction device or a braking device to implement the control signal based on the transducer signal that is received.

2. The control system of claim 1, wherein the one or more vehicles of the vehicle system comprises at least two vehicles, and the modulator device is configured to be located onboard a first vehicle of the at least two vehicles, and the transducer device and the demodulator device are located onboard a second vehicle of the at least two vehicles.

3. The control system of claim 1, wherein the modulator device is configured to control the actuator to create the acoustic signal for propagation within a brake pipe of the vehicle system as the conduit.

4. The control system of claim 1, wherein the transducer device is configured to determine an amplitude of the acoustic signal and to create the transducer signal based on the amplitude that is determined.

5. The control system of claim 4, wherein the transducer device is configured to create the transducer signal with a frequency that is based on the amplitude that is determined.

6. The control system of claim 5, wherein the demodulator device is configured to control the one or more of the traction device or the braking device based on the frequency of the transducer signal.

7. The control system of claim 5, wherein the transducer device is configured to determine the frequency of the transducer signal based on a predetermined function between the frequency and the amplitude that is determined.

8. A method comprising:
receiving a control signal for changing a traction operation or a braking operation of a vehicle system formed from one or more vehicles;
generating an electric modulator signal based on the control signal;
controlling an actuator using the modulator signal to create an acoustic signal for propagation within a conduit extending along the vehicle system;
detecting the acoustic signal propagated in the conduit;
generating an electric transducer signal based on the acoustic signal; and
controlling one or more of a traction device or a braking device to implement the control signal based on the transducer signal that is received.

9. The method of claim 8, wherein the acoustic signal is created for propagation within a brake pipe of the vehicle system as the conduit.

10. The method of claim 8, further comprising determining an amplitude of the acoustic signal, where the transducer signal is created based on the amplitude that is determined.

11. The method of claim 10, wherein the transducer signal is created with a frequency that is based on the amplitude that is determined.

12. The method of claim 11, wherein the one or more of the traction device or the braking device is controlled based on the frequency of the transducer signal.

13. The method of claim 11, further comprising determining the frequency of the transducer signal based on a predetermined function between the frequency and the amplitude that is determined.

14. A control system comprising:
a modulator device configured to receive a control signal for changing a traction operation or a braking operation of a vehicle system, the modulator device configured to control an actuator to create an acoustic signal based on the control signal; and
a demodulator device configured to control one or more of a traction device or a braking device to implement the control signal based on the acoustic signal that is received.

15. The control system of claim 14, further comprising a transducer device configured to detect the acoustic signal that propagates along a conduit of the vehicle system from the actuator to the transducer device.

16. The control system of claim 15, wherein the modulator device is configured to be located onboard a first vehicle of the vehicle system, and the transducer device and the demodulator device are configured to be located onboard a second vehicle of the vehicle system.

17. The control system of claim 15, wherein the conduit comprises a brake pipe of the vehicle system, and the modulator device is configured to control the actuator to create the acoustic signal for propagation within the brake pipe.

18. The control system of claim 15, wherein the transducer device is configured to determine an amplitude of the acoustic signal and to create the transducer signal based on the amplitude that is determined.

19. The control system of claim 18, wherein the transducer device is configured to create the transducer signal with a frequency that is based on the amplitude that is determined.

20. The control system of claim 19, wherein the demodulator device is configured to control the one or more of the traction device or the braking device based on the frequency of the transducer signal.

* * * * *